United States Patent Office 3,488,947
Patented Jan. 13, 1970

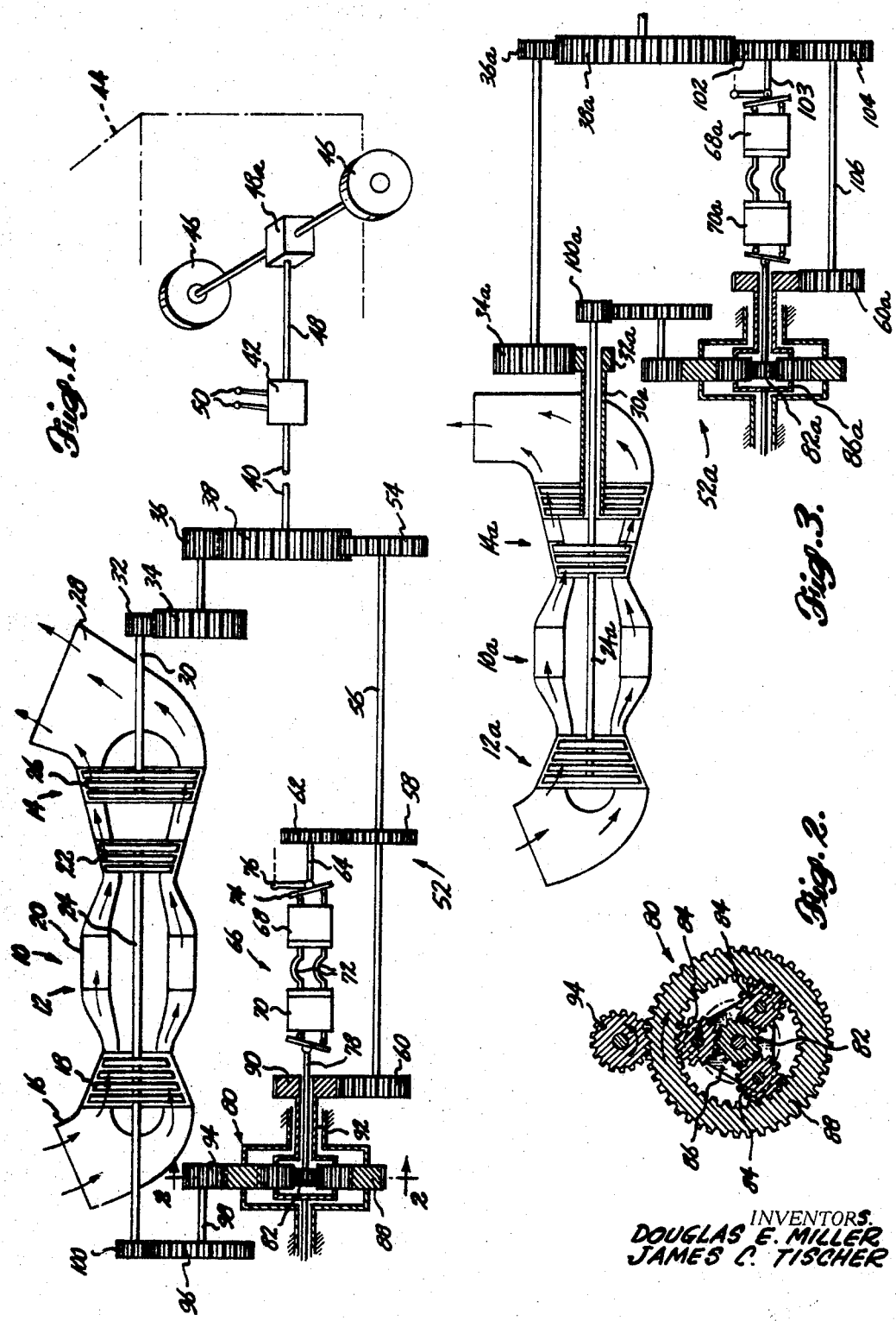

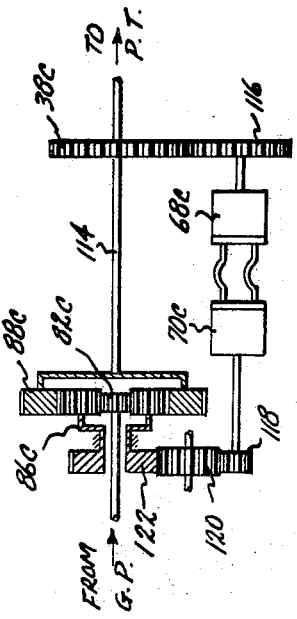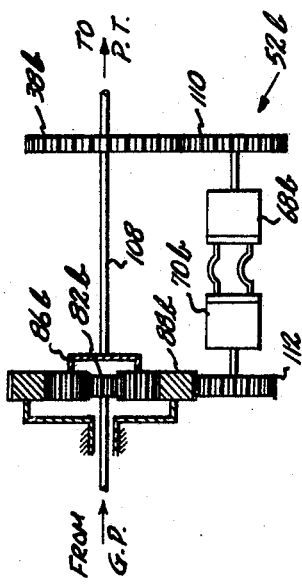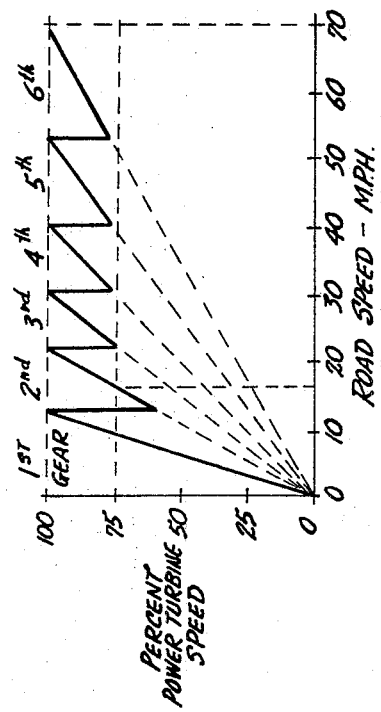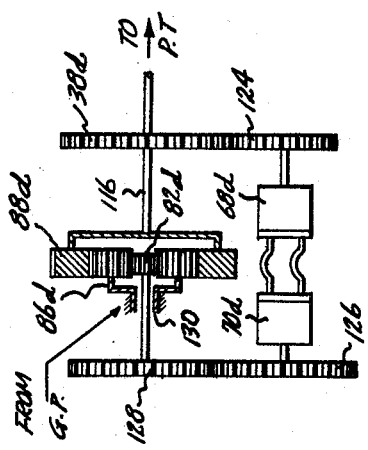

3,488,947
TORQUE TRANSFER APPARATUS FOR A FREE SHAFT GAS TURBINE ENGINE
Douglas E. Miller, Seattle, Wash., and James C. Tischer, Swampscott, Mass., assignors to The Boeing Company, Seattle, Wash., a corporation of Delaware
Filed Nov. 24, 1967, Ser. No. 685,586
Int. Cl. F02c 3/10, 7/02; F16h 47/00
U.S. Cl. 60—39.16     13 Claims

ABSTRACT OF THE DISCLOSURE

A torque transferring unit connected between the otherwise independently rotating power output and gas producing sections of a free shaft gas turbine engine; the transmission comprising a two-path transmission (one-path being a direct drive and the other a variable speed drive) connected between the engine power output and a planetary gear unit, and the planetary gear unit in turn connecting to the engine gas producer section so that torque can be transferred between the two engine sections through the planetary gear unit and the two-path transmission.

BACKGROUND OF THE INVENTION

Field of the invention

This invention relates generally to apparatus to transfer torque between the otherwise independently rotating power output and gas producing sections of a free shaft gas turbine engine. More particularly, it relates to such a torque transferring apparatus for a free shaft gas turbine engine that is used in conjunction with a stepped ratio power transmission such as those commonly used in trucks or automobiles.

Description of the prior art

In a conventional free shaft gas turbine engine, there is a gas producer section and power output section. The gas producer section comprises a compressor, a combustion system, and a gas producer turbine. The compressor, as its name implies, functions to draw in outside air, compress the same, and feed this air through the combustion system. In the combustion system, fuel is burned with a portion of the compressed air, with the resulting gasses being mixed with the remainder of the compressed air and being directed through the gas producer turbine, which transmits torque back to the compressor through the main shaft of the gas producer section. The gasses from the gas producer section then pass through the power turbine of the power output section to drive the same, and then pass out the engine exhaust outlet.

When such a free shaft gas turbine engine is used in conjunction with a stepped ratio vehicular transmission, there are three reasons why it is desirable to transfer torque between the gas producer section and the power output section, namely:

(a) to improve the part-load efficiency of the engine,
(b) to provide controlled vehicle braking by the engine compressor, and
(c) to provide power turbine overspeed protection.

With respect to improving part-load engine efficiency, if there is no torque transfer between the gas producing section and the power output section, the temperature of the gasses leaving the combustion system does not reach the desired operating temperature, this resulting in a decrease in overall cycle efficiency and a corresponding increase in part-load specific fuel consumption. This temperature can be raised by adding more fuel to the air in the combustion system; however, this produces excess torque in the gas producer which tends to accelerate the gas producer to a higher speed than desired. Thus arises the need for transmitting some of the torque in the gas producer section to the power output section during part-load operation.

With respect to braking the vehicle by means of the turbine engine, it is desirable that the braking energy be transmitted to the engine compressor, since this energy can then conveniently be dissipated as heated exhaust air. To achieve maximum braking, the compressor speed should be kept at or just slightly below design speed. Since in a vehicle with a stepped ratio transmission, the speed of the drive shaft will vary during the braking operation (e.g. when the truck is traveling downhill and the driver is shifting several times from a higher to a lower gear), it is desirable that the torque transfer from the drive shaft of the vehicle to the compressor be accomplished in such a manner that the relative speed of the two can be varied.

With respect to the prevention of power turbine overspeed, such a condition is likely to arise when the load is momentarily released, which could, for example, occur while shifting a manual shift truck transmission. With torque transfer between the two turbine sections, the torque tending to overspeed the power turbine would be transmitted to the compressor which would dissipate the energy in the same manner as it would during the engine braking mode of operation.

One prior art approach to this overall problem is to provide a mechanical direct drive between the two turbine sections which can be selectively engaged to transmit torque between the two turbine engine sections. One disadvantage of such a device is that during the braking mode of engine operation the clutch is usually locked up to prevent overheating of the clutch, with the result that the compressor is driven by the power output section at a fixed speed relationship. (Unidirectional torque transmitting devices, such as overrunning clutches, can additionally be used for power turbine overspeed protection.) However, there are two disadvantages to such a torque transfer system. First, as indicated previously, the maximum attainable braking is not achieved unless the compressor is rotating at (or nearly at) full speed, and this is not possible unless the output shaft of the turbine is also turning at full speed (which, as indicated previously, is not possible if the truck or other vehicle is being shifted through several gears). The second disadvantage is that since the braking effort will necessarily be a function of vehicle speed in each gear, there is only limited ability to modulate the braking effort.

Another approach in the prior art has been to provide an infinitely variable transmission to transmit the full torque loads between the gas producer and power output sections. However, to transmit the amount of power required, as in the case of a large truck, the transmission becomes too large and/or expensive to be practical for most applications.

SUMMARY OF THE INVENTION

In the present invention, torque is transmitted between the gas producer and power output sections of the free shaft gas turbine engine through dual torque paths, one of which is a variable speed transmission. The two torque paths are connected to respective inputs (which may alternately be power outputs, depending on the direction of power flow) of a differential transmission unit (in the preferred embodiment, an epicyclic gear system, or more specifically a planetary gear system). The output (which also may alternately be an input) of the epicyclic gearing mechanism is connected to one of the turbine sections, while the two torque paths are connected to the other turbine section.

Thus, it is an object of the present invention to provide improved means to transfer torque between the gas producer and power output sections of a free shaft gas turbine engine, and more particularly to provide such torque transfer means for a free shaft gas turbine engine connected in driving relationship with a power transmission having finite gear ratio changes, as in the case of power transmission for a truck or other vehicle.

FIG. 1 is a semi-schematic view taken generally in side elevation of the apparatus of the present invention as applied to a ground traveling vehicle powered by a free shaft gas turbine engine through a step ratio power transmission;

FIG. 2 is a transverse sectional view taken on line 2—2 of FIG. 1;

FIG. 3 is a semi-schematic view, similar to that of FIG. 1, showing a second embodiment of the present invention;

FIG. 4 is a semi-schematic view, similar to that of FIG. 1, of a third embodiment of the present invention;

FIG. 5 is a semi-schematic view similar to that of FIG. 1, of a fourth embodiment of the present invention;

FIG. 6 is a semi-schematic view, similar to that of FIG. 1, of a fifth embodiment of the present invention; and FIG. 7 is a graph illustrating the operating characteristics of the apparatus shown in FIG. 1.

DESCRIPTION OF THE PREFERRED EMBODIMENTS

First embodiment

In FIG. 1, wherein is shown the first embodiment of the present invention, numeral 10 designates generally a conventional free shaft gas turbine engine having a forward gas producer section 12 and rear power output section 14. The gas producer section comprises an air inlet 16, an air compressor 18, a combustion system 20 and a gas producer turbine 22. The gas producer turbine 22 and the air compressor 18 are mounted to a common shaft 24. Outside air is drawn into the inlet 16 by the compressor 18, which feeds this air under pressure to the combustion system 20. In the combustion system 20, fuel is burned with a portion of this compressed air, and the resulting gasses are combined with the rest of the compressed air to be directed through the gas producer turbine 22, thus exerting a torque on the gas producer turbine 22 which then transmits this torque through the shaft 24 to rotate the compressor 18.

The gasses that are emitted from the turbine 22 of the gas producer section 12 then pass into a power turbine 26 in the power output section 14 and thence out an exhaust duct 28. Extending rearwardly from the power turbine 26 is an output shaft 30 of the power output section 14. This output shaft 30, through a set of speed reducing gears 32, 34, 36 and 38, respectively, powers a main drive shaft 40, the gear 38 being secured to this shaft 40.

This shaft 40 is the power input shaft to a step ratio power transmission 42 of a ground traveling vehicle, indicated in broken lines at 44, this transmission 42 powering drive wheels 46 of the vehicle 44 through a shaft 48 and a differential 48a. This step ratio power transmission 42 is or may be of conventional design, such as those used in present day trucks, the transmission 42 (as the phrase "step ratio" indicates) being characterized in that it is capable of transmitting power from the shaft 40 to the shaft 48 at a number of different gear ratio transmission settings, at which the respective gear ratios between the shafts 40 and 48 differ from one another in steps or increments. (The operating characteristics of a typical stepped ratio vehicular transmission are shown in the graph of FIG. 7.) Accordingly, manual shifting levers 50 are provided so that the transmission may be shifted through its various "gears" or settings.

The components shown in FIG. 1 which have been described thus far either are or may be of conventional design and can be seen to comprise a wheel driven vehicle 44 (e.g. a truck) powered by a free-shaft gas turbine engine 10, which drives the truck 44 through a manually operated step ratio gear transmission 42. The torque transfer apparatus of the first embodiment of the present invention will now be described, this apparatus also being illustrated in FIG. 1 and bearing the general numerical designation 52.

This apparatus comprises a gear 54 meshing with the main drive gear 38 and connecting to a forwardly extending shaft 56. Fixedly secured to this shaft 56 at spaced locations thereon are two torque gears 58 and 60, respectively, which transmit torque from the gear 54 along, respectively, a first variable drive and a second direct drive torque path.

The variable drive torque gear 58 meshes with gear 62 which in turn supplies rotary power through shaft 64 to one side of an infinitely variable transmission, generally designated 66. This transmission 66 comprises a pair of hydraulic pump/motors, shown schematically at 68 and 70, respectively, operatively connected by hydraulic lines 72. These pump/motors are or may be similar to those shown in U.S. Patent 3,188,807, issued to Rogers on June 15, 1965. The pump/motor 68 is a variable displacement pump/motor whose rate of volume of fluid pumped is controlled by varying the degree of slant of the swash plate 74 which connects to the pistons of the pump/motor 68, with the direction of fluid flow being determined by the direction of slant of the swash plate 74. The swash plate 74 is provided with a suitable control means as indicated by the lever 76. The pump/motor 70 is a constant displacement pump/motor. When the pump control lever 76 is moved in either direction to its maximum output position (at which the swash plate 74 is at its maximum angle of slant in the selected direction), the pump/motor 68 is operating at full capacity, and drives the constant displacement pump/motor 70 at the same rate of rotation as the pump/motor 68. As the lever 76 is operated to lessen the angle of the swash plate 74, the output of the pump/motor 68 is lessened to cause a corresponding decrease in the rotational speed of the driven pump/motor 70; and as the lever 76 is moved beyond its neutral position to slant the swash plate 74 in the opposite direction, the direction of rotation of the pump/motor 70 is reversed. The output of the pump/motor 70 is connected to a shaft 78, and thus the ratio of the speed of rotation between the variable transmission output shaft 78 and the input shaft 64 can be set at any value between 1 to 1 and 0 to 1 in either direction of rotation.

There is a planetary gear unit 80, which operates as a differential transmission and comprises a sun gear 82, a number of planet gears 84 mounted to a planet carrier 86, and a ring gear 88. The output shaft 78 of the infinitely variable transmission 66 (i.e. the pump/motors 68 and 70 and their associated components) is connected to the sun gear 82 and causes the sun gear 82 to rotate in either direction, depending upon the position of the swash plate 74.

As indicated previously, the gear 60 supplies the initial torque for the direct drive path of the aforementioned dual torque path of the torque transfer apparatus 52. This gear 60 meshes with a gear 90 mounted to a hollow shaft 92 disposed concentrically about the aforementioned shaft 78, this shaft 92 being in turn connected to the planet carrier 86. Thus in this first embodiment, the variable drive torque path is to the sun gear 82, while the direct drive torque path is to the planet carrier 86, which in turn transmits this torque to the planet gears 84.

The torque output from the planetary unit 80 is through the ring gear 88, which meshes with a gear 94 connected to gear 96 through a shaft 98. The gear 96 in turn meshes with a gear 100 that is fixedly connected to the previously described main shaft 24 of the gas producer section 12.

Method of operation of first embodiment

The operation of the torque transfer apparatus 52 will be described first with respect to the braking mode.

The relative sizes of the various gears and other components of the torque transfer apparatus 52 will depend, of course, upon the specific characteristics desired for a particular turbine engine in a particular application. In describing the first embodiment, let it be assumed that these components are so selected that with the gas producer section 12 and the power output section 14 both rotating at their respective maximum design speeds, there is no rotation of the sun gear 82, the variable drive control lever 76 being in a neutral position so that even though the pump/motor 60 rotates, there is no rotation of the driven pump/motor 70.

Let it be assumed that the vehicle 44 is beginning to travel a long downhill course, during which it is desired to obtain maximum braking power from the compressor 18. Power will be transmitted from the vehicle drive wheels 46 through the vehicle transmission 42 to the main drive gear 38. The gear 38 transmits this power to the torque transfer apparatus 52 which in turn drives the compressor 18 so that the energy from the wheels 46 is dissipated as hot compressed air. (In the present embodiment, this air will be discharged out the exhaust 28. However, since this air will exert some torque on the power output turbine 26 and thus tend to drive the gear 38 against the braking force of the compressor 18, an auxiliary outlet could be provided for the compressor 18, and such an auxiliary outlet would be selectively opened to direct the compressed air from the compressor 18 directly to the outside atmosphere instead of through the power turbine 26 and out the exhaust 28.)

A typical situation is that in which a truck is traveling along a level roadway at perhaps 60 or 70 miles an hour, and as the truck approaches and goes into the initial portion of a downhill grade, it is desired to gear down so that the truck can descend the steepest part of the grade at a controllable speed of perhaps 30 miles an hour. The operating characteristics of the vehicle as it approaches the downhill grade and travels over its initial portion where the slope gradually increases is best illustrated in the graph of FIG. 7.

It can be seen that with the truck transmission 42 in its sixth gear, the power turbine 26 is rotating at maximum design speed when the road speed of the truck 44 is nearly 70 miles an hour. When in this sixth gear the truck has slowed down to about 53 miles an hour, the power turbine 26 has slowed down to nearly 75% of maximum design speed, and the driver will then manipulate the gear shift levers 50 to shift the transmission 42 into its fifth gear. In this fifth gear with the truck traveling at about 53 miles per hour the power turbine 26 is operating at its maximum design speed and drops down to nearly 75% of its maximum design speed when the road speed of the truck 44 reaches approximately 40 miles per hour. At this time the truck is shifted into fourth gear and on down until the truck reaches its desired speed for a controlled descent over the steepest portion of the downhill grade.

As indicated previously, to obtain maximum braking power from the compressor 18, it is necessary that the compressor 18 be rotating at (or nearly at) maximum design speed throughout the shifting of gears and consequent variations in the rotational speed of the power turbine 26.

In a situation where both the compressor 18 and the power turbine 26 are rotating at maximum design speed, the torque path from the main drive gear 38 is through the gear 54 to the gear 60, thence through the gear 90 to the planet carrier 86. To insure that the sun gear 82 remains stationary, it may be necessary for the pump/motor 68 to pump just enough hydraulic fluid to the pump/motor 70 to maintain adequate hydraulic pressure therein to resist rotation of the sun gear 82. The rotation of the planet carrier 86 around the sun gear 82 causes rotation of the ring gear 88, which through gears 94, 96, and 100 transmits power to the compressor 18 through shaft 24.

When the truck remains in a particular gear and slows down to the extent that the speed of the power turbine 26 drops to approximately 75% of maximum design speed, the angle of the swash plate 74 is moved to cause maximum output of the pump/motor 68 to drive the sun gear 82 in a direction opposite to the rotation of the planet carrier 86. Thus, while the power turbine 26 is rotating at a slower speed, with the planet carrier 86 rotating at a correspondingly slower speed, the ring gear 88 still rotates at a speed sufficient to cause the compressor 18 to rotate at its maximum design speed. Thus about 75% of the braking power is transmitted through the direct drive torque path, and 25% of the braking power is transmitted through the variable drive torque path. When the truck is shifted into its next lower gear, the power turbine 26 is again operating at its maximum design speed, and the swash plate 74 is moved to stop rotation of the sun gear 82. As the truck slows down further the swash plate 74 is moved to maintain the speed of the compressor 18 at its maximum design speed.

During part-load operation of the truck 44, the power turbine 26 may be rotating at (or nearly at) its maximum design speed while the gas producer section 12 may be rotating at somewhat less than maximum design speed. Further, as indicated previously herein, during part-load operation the gas producer turbine 22 will usually generate more power than is required to drive the compressor 18, and to obtain proper engine efficiency, some of this excess power must be transferred back to the engine power output section 14.

During part-load operation of the engine 10, the torque paths through the torque transfer apparatus 52 are the same as described previously in the description of the braking mode of operations, except in the opposite direction. However, when the power output section 14 is rotating at a higher speed (relative to its maximum design speed) than the gas producer section 12, the direction of the sun gear 82 must be reversed so that the sun gear 82 rotates in the same direction as the planet carrier 86. This, of course, is accomplished by reversing the slant of the swash plate 74. Also in some operating conditions, the power flow through the direct drive may be toward the power turbine 26, while the power flow through the variable drive is in the opposite direction.

Description of embodiments 2 through 5

The second embodiment of the present invention is illustrated in FIG. 3. Components of this second embodiment, corresponding to those of the first embodiment, are given like numerical designations, with an *a* subscript distinguishing those of the second embodiment. Thus, there is a free shaft gas turbine engine 10a, comprising gas producer and power output sections 12a and 14a, respectively, which sections are interconnected by a torque transfer apparatus 52a. Although the engine 10a and torque transfer apparatus 52a are embodied in a vehicle with a step ratio transmission, as in the first embodiment, these latter components are, for convenience of illustration, not repeated in FIG. 3.

In the second embodiment, the power output shaft 30a powers the main output gear 38a which in turn meshes directly with a gear 102. The variable drive torque path is from this gear 102. The variable drive torque path is from this gear 102 through a shaft 103 to the pump/motor 68a, which drives the pump/motor 70a to turn the sun gear 82a. The direct drive torque path is from the gear 102 through gear 104 which through the drive shaft 106 drives the gear 60a. This gear 60a meshes with the gear 90a which in turn drives the planet carrier 86a, as in the previous embodiment.

The mode of operation of this second embodiment is substantially the same as that of the first embodiment. However, it will be noted that since the main shaft 24a of the gas producer section 12a extends through the center of the power output shaft 30a, this permits the gear 100a to be located at the rear of the engine 10a. Thus, the entire torque transfer apparatus 52a can be of more compact construction.

The third, fourth, and fifth embodiments are shown in FIGS. 4, 5, and 6, respectively. Since the general mode of operation of these last three embodiments is substantially the same as the first two embodiments, only a cursory description of these last three embodiments is necessary for a clear understanding thereof. Components of these last three embodiments which are generally similar to corresponding components of the first two embodiments will be given like numerical designations, with the subscript b, c, and d distinguishing those of, respectively, the third, fourth, and fifth embodiments.

In the third embodiment of FIG. 4, the direct drive torque path of the torque transfer apparatus 52b is from the main drive gear 38b through shaft 108 to the planet carrier 86b. The variable drive torque path is from gear 110 which meshes with gear 38b, through the pump/motor 68b and pump/motor 70b to gear 112, which meshes with exterior teeth of the ring gear 88b. The sun gear 82b then connects to the gas producer section through an appropriate gear reduction drive.

The fourth embodiment is shown in FIG. 5. The direct drive torque path is from the main output gear 38c through shaft 114 to the ring gear 88c. The variable drive torque path is from the gear 116, which meshes with gear 38c, through the pump/motor 68c and pump/motor 70c, thence through a set of speed reducing gears, 118, 120 and 122 to the planet carrier 86c. The sun gear 82c connects through an appropriate gear reduction drive to the gas producer section.

The fifth embodiment is shown in FIG. 6. The direct drive is from the main drive gear 38d, through shaft 116 to the ring gear 88d. The variable drive torque path is from the gear 124 meshing with the gear 38d, through the pump/motor 68d and pump/motor 70d, thence through gears 126, and 128 to the sun gear 82d. The planet carrier 86d connects to a shaft 130 which in turn connects to the gas producer section.

We claim:

1. In combination with a free shaft gas turbine engine, comprising two engine components, namely a compressor and a main power output that is driven from a power turbine of said engine, a transmission system having two input/output elements between which said system transfers torque, one of said input/output elements being connected to said power output and the other input/output element being connected to said compressor, said transmission system comprising:
   (a) a differential transmission unit comprising three coacting torque transmitting components,
   (b) one of said torque transmitting components being operatively connected to one of said input/output elements,
   (c) a dual parallel power transmission operatively connected to the other input/output element and comprising apparatus providing:
      (1) a first torque path portion, and
      (2) a second variable speed torque path portion,
   (d) said two torque path portions being operatively connected to a respective one of the other two differential torque transmitting components,
   (e) said transmission system characterized in that torque is transferred from said power output through said two torque path portions, through said differential transmission unit to said compressor.

2. The apparatus as recited in claim 1, wherein there is a step ratio power transmission operatively connected to said power turbine.

3. The apparatus as recited in claim 2, wherein there is a vehicle having ground engaging wheels, and said wheels are operatively connected to said step ratio transmission.

4. The apparatus as recited in claim 1, wherein said differential transmission unit comprises an epicyclic gear unit, with said differential components comprising, respectively, a sun gear, a ring gear, and planetary gear means operatively engaging said sun gear and said ring gear.

5. The apparatus as recited in claim 4, wherein said variable speed torque path portion is connected to said sun gear.

6. The apparatus as recited in claim 5, wherein said first torque path portion is connected to said planetary gear means.

7. The apparatus as recited in claim 1, wherein said variable speed torque path portion is operatively connected to said ring gear.

8. The apparatus as recited in claim 7, wherein said first torque path portion is operatively connected to said planetary gear means.

9. The apparatus as recited in claim 1, wherein said variable speed torque path portion is operatively connected to said planetary gear means.

10. The apparatus as recited in claim 9, wherein said first torque path portion is operatively connected to said ring gear.

11. The apparatus as recited in claim 1, wherein said first torque path portion comprises a direct drive unit.

12. The apparatus as recited in claim 1, wherein said variable speed torque path portion comprises positive displacement pump/motors, at least one of which is a variable displacement pump/motor.

13. The apparatus as recited in claim 12, wherein said variable speed torque path portion is reversible with respect to the direction in which torque is transmitted.

References Cited

UNITED STATES PATENTS

| 2,153,997 | 4/1939 | Verderber et al. | 74—687 |
| 2,390,240 | 12/1945 | De Lancey | 74—687 |
| 3,286,543 | 11/1966 | Porter | 60—39.16 X |
| 3,290,878 | 12/1966 | Wickman | 60—39.16 |
| 3,396,607 | 8/1968 | Ross | 74—687 |

CARLTON R. CROYLE, Primary Examiner

ALLAN D. HERRMANN, Assistant Examiner

U.S. Cl. X.R.

74—687; 180—66, 90